United States Patent Office 2,831,765
Patented Apr. 22, 1958

2,831,765
PRODUCTION OF MONOCHROMATIC AND MULTI-COLOURED PICTURES

Peter Kleinschmidt, Berlin-Dahlen, Germany, assignor to Variofix (Proprietary) Limited, Johannesburg, Transvaal, Union of South Africa No Drawing. Application November 30, 1954
Serial No. 472,217

Claims priority, application Union of South Africa March 5, 1953

35 Claims. (Cl. 96—35)

This invention relates to the production of monochromatic and multicoloured pictures. The pictures may either be produced on portable plates or, alternatively, on walls and other fixed plane surfaces of masonry, wood, metal or other material.

The process of the invention is primarily intended to be used for advertising purposes and it has the advantage that the pictures can easily be washed off with an organic solvent such as benzene, thus enabling the same surface to be used again and again for the superimposition thereon of successive and different pictures. In normal circumstances, however, the pictures are practically unaffected by light and atmospheric conditions.

The process of the invention comprises the steps of providing a picture base; sealing the pores of such base in the event that it is composed of porous material; superimposing a light-sensitive emulsion on the base; projecting a picture onto the emulsion surface; developing and fixing the latent image; washing the emulsion from the unexposed parts; covering the surface with a prime coat of oil paint which will adhere firmly to the unexposed parts but only loosely to the exposed parts; and removing the oil paint together with the emulsion from the exposed parts by means of an acid.

It is desirable as a final step to apply a coat of colourless transparent varnish (e. g. a chlorinated rubber varnish) to the picture surface.

The picture base itself may comprise a plate made, for example, of asbestos-cement, metal (e. g. aluminium), or a plastic material. The cement used in the production of asbestos-cement plates is preferably white Dyckerhoff cement (a white Portland cement) and to seal the pores such plates should be thoroughly soaked in a solution of a zinc fluate (e. g. zinc fluosilicate ($ZnSiF_6$)) and thereafter left to dry. If metal plates are to be used, any grease must be removed therefrom (e. g. by washing with an ammonia solution) and the plate surface should be roughened if necessary.

Prior to the superimposition of the emulsion, it is desirable to cover the base with a coat of chlorinated rubber varnish which, if the base is of metal, should contain a white pigment.

The application of a thin undercoat of varnish (e. g. pine-gum varnish) prior to the application of the prime coat of oil paint will assist the latter to adhere where required i. e. on the unexposed parts, and this undercoat may be removed together with the prime coat from the exposed parts by washing with water (50° C.). The emulsion may be removed from the exposed parts by means of a dilute acid solution (e. g. 20 gms. $H_2SO_4$ per litre of water). Removal of the emulsion from the unexposed parts is effected by washing with water at a temperature of 40–50° C.

The process of the invention also includes the use as a base of an existing surface which is covered with a smooth coating of calcium carbonate mixed with a binding agent or, alternatively, of a base in which calcium carbonate and a binding agent are constituent materials. In these circumstances the pores are sealed by means of a nitrocellulose varnish and after removal of the pine-gum varnish and oil paint from the exposed parts, the emulsion is removed from such parts and they are rendered porous once again by treatment with an acid solution (e. g. 60 gms. $H_2SO_4$ per litre of water). Thereafter the surface is treated with a gum-arabic-nitric acid solution of such strength that it will not affect the varnish and paint-covered unexposed parts but will react with the bared calcium carbonate on the exposed parts to form calcium nitrate which is kept moist whilst the surface is covered with oil paint prior to the final application of the colourless transparent varnish. Since calcium nitrate has the property that, when moist, it does not absorb oil paint, it will be understood that the entire surface may be painted over and only the unexposed parts will accept the paint.

In the case of the application of a smooth porous coating to existing surfaces such as walls, the binding agent may comprise an agglutinant dissolved in an organic solvent. Pyroxylin has been found to be a suitable agglutinant, although other cellulose-esters or silicons may be used. The organic solvent may conveniently comprise ethyl or methyl acetate ($C_2H_5COOCH_3$ or $CH_3COOCH_3$).

Where calcium carbonate and a binding agent are incorporated as constituent materials of a plate, such plate may be made of asbestos, calcium carbonate and cement, the cement acting as the aforesaid binding agent. The proportions used may conveniently be 30 parts of calcium carbonate, 15 parts of asbestos fibres, and 85 parts of cement, Dyckerhoff cement being especially suitable on account of its white colour. Sufficient water is added to permit casting and the plate must be stored for at least 4 weeks to ensure proper drying.

The calcium carbonate may comprise sifted and finely-ground limestone. The limestone used should contain from 70% to 99%, and preferably more than 90%, of calcium carbonate. Natural limestone, such as Jura limestone or marble, is particularly suitable and very satisfactory results have been obtained with a limestone containing 97.2% calcium carbonate, 1.9% silicic acid, 0.2% alumina, 0.5% ferric oxide ($Fe_2O_3$) and 0.2% impurities such as magnesia or manganese oxide. The ground limestone should be passed through sieves of from 150 to 5000 meshes per square centimetre. A sieve having 260 meshes per square centimetre is preferred.

The process of the invention also includes within its scope the production of muticoloured pictures in which the various colours are either disposed side by side or superimposed one upon the other.

Various examples of specific methods of carrying the invention into effect will now be given.

In the production of pictures on a plate made of asbestos fibres and Dyckerhoff cement in known manner, the plate is first soaked in a 12% solution of zinc fluosilicate ($ZnSiF_6$) and then left to dry for several hours. It is then coated with a colourless chlorinated rubber varnish applied by means of a spray gun and again left to dry.

A silver-halide-gelatine emulsion (e. g. 25 gms. gelatine, 75 gms. silver-halide and 1000 gms. of distilled water) is now applied to the surface of the plate through a warm spray gun in a dark room illuminated with red light. Care must be taken to apply the emulsion evenly and its application temperature should be about 40° C. The plate is then dried with air at a temperature not exceeding 40° C.

By using a diapositive of the required picture or, for half-tone results, a half-tone or screen positive, and projecting it in the dark room in enlarged form onto the light-sensitive emulsion, a latent image is produced. Care should be taken that a screen positive used for half-tone results has well-covered and sharply defined points. For silhouettes, a stencil may be used. The time of exposure will naturally vary according to the degree of enlargement but, in general, it will be from 2 to 15 minutes.

The latent image is developed by means of a hardening developer the temperature of which is 18° C. After washing with cold water, the unhardened emulsion is removed from the unexposed parts with water at a temperature of 40–50° C. Care must be taken to see that no emulsion remains on such unexposed parts.

After the hardened emulsion has dried, a thin coat of pine-gum varnish is applied to the whole plate and, when this has dried, the entire surface of the plate is covered with a thin priming of oil paint which, with the varnish, will be found to adhere to the unexposed parts but only loosely to the exposed parts. The pine-gum varnish and oil paint should preferably be of the same colour. When the paint has dried, the surface is washed with lukewarm water, whereupon the paint and varnish on the hardened emulsion on the exposed parts come away to lay bare the emulsion. The surface is now treated with dilute sulphuric acid (20 gms. $H_2SO_4$ per litre of water), the effect of which is to remove the emulsion from the exposed parts. The pine-gum varnish and paint remain on the unexposed parts and form the picture which is finally covered with a coat of colourless chlorinated rubber varnish in order to make it weatherproof.

For the production of multicoloured pictures in which the colours are superimposed one upon the other, a plurality, usually four, diapositives are required instead of one. These diapositives are produced according to colour extractions as used for the production of colour blocks in the colour printing trade, and they are projected in sequence, a suitable sequence being blue, yellow, red and finally black. After the first projection has taken place, the latent image developed and the emulsion on the unexposed parts removed as described above, the surface is covered with pine-gum varnish and then with a prime coat of oil paint. The pine-gum varnish and the paint should be exactly the same colour as the colour of the corresponding projection.

The pine-gum varnish, oil paint and emulsion are removed from the exposed parts as described above and a fresh coat of colourless chlorinated rubber varnish is applied to the entire surface. The emulsion for the next colour to be used is then superimposed upon it. The second diapositive is now projected and the process repeated down to the point where the unexposed parts are coloured to correspond with the colour of the second projection. The third and fourth diapositives are projected in the same manner in sequence and, of course, before each projection, the surface has to be given a fresh coat of chlorinated rubber varnish and emulsion. Care must naturally be taken to see that the dots of the diapositives fit exactly. After the four colours have been united into a completed coloured picture, a final coat of colourless chlorinated rubber varnish should be applied over the entire surface.

It is also possible to project two diapositives simultaneously e. g. black and red; black and yellow; and black and blue.

For the production of pictures on specially prepared plates made of calcium carbonate, asbestos fibres and Dyckerhoff cement, the process used is generally similar. The pores of the plate are sealed by the application of a thin coating of diluted colourless nitro-cellulose varnish and thereafter cleaned by means of a dilute alum solution washed with cold water and allowed to dry. The procedure is then as stated above up to the point where the paint and pine-gum varnish are removed from the exposed parts by washing with luke-warm water. A slightly stronger sulphuric acid solution is now employed (60 gms. $H_2SO_4$ per litre of water) and the effect is not only to remove the emulsion but also the nitro-cellulose varnish from the exposed parts. The acid has no effect on the paint and varnish-protected unexposed parts.

Next, the surface is treated with a weak solution of gum-arabic-nitric-acid (e. g. 2 parts of nitric acid to 98 parts gum-arabic solution, the latter itself consisting of 1 part gum-arabic to 19 parts of water). As a result of this treatment, a thin layer of calcium nitrate is formed on the colour-free (exposed) parts of the picture where the calcium carbonate is laid bare. Once again, the acid has no effect on the paint and varnish-protected unexposed parts.

When moist, calcium nitrate does not retain oil paint, so that final colouring can be effected by applying oil paint in the desired colour over the whole surface of the plate provided the latter is kept moist. The paint will adhere to the prime coat on the unexposed parts but can be washed off the remaining exposed parts. If desired, the prime coat on the unexposed parts can be removed with turpentine before the final colouring takes place.

It should be noted that calcium nitrate has to be moist before it is rendered non-absorbent to oil paint. Consequently, in all cases it is possible also to colour the exposed parts of a picture if it is desired to do so. The oil paint is merely applied to such parts when the calcium nitrate film is dry.

If it is desired to produce a multi-coloured picture with the various colours disposed side by side and not superimposed on each other, it is, of course, necessary to work with a certain amount of care. For example, if the colours, red, blue and yellow are to be used, the parts of the picture to be coloured yellow (the lightest of the three colours) may be masked on the projection plate. The corresponding parts on the emulsion surface will then be exposed and the calcium carbonate on such parts may be bared and treated to produce a calcium nitrate film in the manner described above. The red and blue colouring can then be applied without regard to the fact that it may overlap onto the parts ultimately to be coloured yellow, since the calcium nitrate will have been moistened and will not absorb the red or blue paint. When the calcium nitrate film has been allowed to dry, the yellow colouring may be effected but this will have to be done carefully so as not to overlap the adjacent red or blue areas.

Should a relief picture be required, the picture base must contain calcium carbonate and the exposed parts are left uncoloured (i. e. by finally colouring the picture when the calcium nitrate film is moist). Treatment of the surface with the gum-arabic-nitric acid solution is carried out until the exposed parts have been eaten away to the required depth and, for this purpose, a somewhat stronger solution may be used (e. g. 10 to 30 parts of nitric acid in 90 to 70 parts of gum-arabic solution, the latter itself consisting of 1 part of gum-arabic to 19 parts of water). This solution still has no effect on the paint and varnish-protected unexposed parts. As the relief begins to appear, the elevations should be dusted with asphalt powder to prevent the acid solution under washing them.

For the production of pictures on already existing surfaces such as, for example, the walls of a room, the process is essentially the same. The surface is prepared by covering it with a smooth porous coating of 60 parts of calcium carbonate to 40 parts of agglutinant in solution (the solution being made up of 30% pyroxylin and 70% ethyl acetate). Since the porous coating is inclined to dry rather rapidly, the exact proportions used will depend on the size of the surface and the speed with which the coating is applied. If only small areas are to be covered, the proportion of ethyl acetate may be reduced. When the coating is thoroughly dry, the colourless nitro-cellulose varnish is applied and the process is carried out in exactly the same manner as that described above with reference to a plate made from calcium carbonate, asbestos and cement.

Multi coloured pictures can, of course, be produced on calcium carbonate-containing surfaces by using a plurality of diapositives and projecting them in sequence as previously described.

This application is a continuation-in-part of my copending application Serial No. 350,269, filed April 21, 1953, and of my copending application Serial No. 350,270, filed April 21, 1953, both now abandoned.

I claim:

1. A process for the production upon a base of pictures which are readily washed off said base with an organic solvent to free the base for subsequent use in producing new pictures thereon which comprises the steps of providing a non-porous picture base, coating said base with a chlorinated rubber varnish, superimposing a light-sensitive emulsion on the varnish-coated base, projecting a picture onto the emulsion surface, developing and fixing the latent image, washing the emulsion from the unexposed portions, covering the surface with a prime coat of oil paint which will adhere firmly to the unexposed portions but only loosely to the exposed portions, and removing the oil paint prime coat together with the emulsion from the exposed portions by means of an acid.

2. A process for the production upon a base of pictures which are readily washed off said base with an organic solvent to free the base for subsequent use in producing new pictures thereon which comprises the steps of providing a non-porous picture base, coating said base with a chlorinated rubber varnish, superimposing a light-sensitive emulsion on the varnish-coated base, projecting a picture onto the emulsion surface, developing and fixing the latent image, washing the emulsion from the unexposed portions, covering the surface with a prime coat of oil paint which will adhere firmly to the unexposed portions but only loosely to the exposed portions, and removing the oil paint prime coat together with the emulsion from the exposed portions by means of an acid, and applying a coat of colorless transparent varnish to the picture surface.

3. A process for the production upon a base of pictures which are readily washed off said base with an organic solvent to free the base for subsequent use in producing new pictures thereon which comprises the steps of providing a non-porous asbestos cement picture base, coating said base with a chlorinated rubber varnish, superimposing a light-sensitive emulsion on the varnish-coated base, projecting a picture onto the emulsion surface, developing and fixing the latent image, washing the emulsion from the unexposed portions, covering the surface with a prime coat of oil paint which will adhere firmly to the unexposed portions but only loosely to the exposed portions, and removing the oil paint prime coat together with the emulsion from the exposed portions by means of an acid.

4. A process for the production upon a base of pictures which are readily washed off said base with an organic solvent to free the base for subsequent use in producing new pictures thereon which comprises the steps of providing a non-porous picture base comprising a plate formed from asbestos fibers and white Portland cement, coating said plate with a chlorinated rubber varnish, superimposing a light-sensitive emulsion on the varnish-coated base, projecting a picture onto the emulsion surface, developing and fixing the latent image, washing the emulsion from the unexposed portions, covering the surface with a prime coat of oil paint which will adhere firmly to the unexposed portions but only loosely to the exposed portions, and removing the oil paint prime coat together with the emulsion from the exposed portions by means of an acid.

5. A process for the production upon a base of pictures which are readily washed off said base with an organic solvent to free the base for subsequent use in producing new pictures thereon which comprises the steps of providing a non-porous picture base comprising a metal plate, coating said plate with a chlorinated rubber varnish, superimposing a light-sensitive emulsion on the varnish-coated base, projecting a picture onto the emulsion surface, developing and fixing the latent image, washing the emulsion from the unexposed portions, covering the surface with a prime coat of oil paint which will adhere firmly to the unexposed portions but only loosely to the exposed portions, and removing the oil paint prime coat together with the emulsion from the exposed portions by means of an acid.

6. A process for the production upon a base of pictures which are readily washed off said base with an organic solvent to free the base for subsequent use in producing new pictures thereon which comprises the steps of providing a picture base comprising a plate formed from asbestos fibers and white Portland cement, rendering said base non-porous by soaking said plate in a solution of zinc fluosilicate and allowing the plate to dry, coating said plate with a chlorinated rubber varnish, superimposing a light-sensitive emulsion on the varnish-coated base, projecting a picture onto the emulsion surface, developing and fixing the latent image, washing the emulsion from the unexposed portions, covering the surface with a prime coat of oil paint which will adhere firmly to the unexposed portions but only loosely to the exposed portions, and removing the oil paint prime coat together with the emulsion from the exposed portions by means of an acid.

7. A process for the production upon a base of pictures which are readily washed off said base with an organic solvent to free the base for subsequent use in producing new pictures thereon which comprises the steps of providing a non-porous picture base comprising a metal plate, treating said plate with an ammonia solution to remove any grease therefrom, roughening the surface of said plate, coating said plate with a chlorinated rubber varnish, superimposing a light-sensitive emulsion on the varnish-coated base, projecting a picture onto the emulsion surface, developing and fixing the latent image, washing the emulsion from the unexposed portions, covering the surface with a prime coat of oil paint which will adhere firmly to the unexposed portions but only loosely to the exposed portions, and removing the oil paint prime coat together with the emulsion from the exposed portions by means of an acid.

8. A process for the production upon a base of pictures which are readily washed off said base with an organic solvent to free the base for subsequent use in producing new pictures thereon which comprises the steps of providing a non-porous picture base, coating said base with a chlorinated rubber varnish containing a white pigment, superimposing a light-sensitive emulsion on the varnish-coated base, projecting a picture onto the emulsion surface, developing and fixing the latent image, washing the emulsion from the unexposed portions, covering the surface with a thin undercoat of pine-gum varnish, covering the undercoat with a prime coat of oil paint which will adhere firmly to the unexposed portions but only loosely to the exposed portions, and removing the oil paint prime coat and the undercoat together with the emulsion from the exposed portions by means of an acid.

9. A process for the production upon a base of multicolored pictures which are readily washed off said base with an organic solvent to free the base for subsequent use in producing new pictures thereon which comprises the steps of providing a non-porous picture base, coating said base with a chlorinated rubber varnish, superimposing a light-sensitive emulsion on the varnish-coated base, projecting a color extraction of the required picture onto the emulsion surface, developing and fixing the latent image, washing the emulsion from the unexposed portions, covering the surface with a prime coat of oil paint which will adhere firmly to the unexposed portions but only loosely to the exposed portions, removing the oil paint prime coat together with the emulsion from the exposed portions by means of an acid, covering the surface with a coat of colorless varnish, applying a fresh coat of light-sensitive emulsion, projecting a second color extraction of the picture on the emulsion surface, and repeating the process with further color extractions.

10. A process, according to claim 9, wherein the respective prime coats of oil paint are of the same color as the respective color extractions used.

11. A process, according to claim 9, wherein four color extractions, namely, yellow, blue, red and black, are used.

12. A process for the production of pictures on an existing surface which comprises the steps of covering the surface with a smooth porous coating of calcium carbonate mixed with a binding agent in the nature of an agglutinant, allowing the coating to dry, applying a coating composition to said first-named coating which seals the pores of the first coating against penetration by a light-sensitive emulsion, superimposing on said coatings said light-sensitive emulsion, projecting a picture onto the emulsion surface, developing and fixing the latent image, washing the emulsion from the unexposed portions, applying a prime coat of oil paint that adheres firmly to the unexposed portions but only loosely to the exposed portions, removing the prime coat, the emulsion and said composition from the exposed portions by means of an acidic agent, which renders the coating porous again on such portions, applying a gum-arabic-nitric acid solution of such strength that it will not affect the paint-covered unexposed portions but will react with the bared calcium carbonate on the exposed portions to form calcium nitrate, and finally coloring with oil paint.

13. A process for the production of pictures which comprises producing a picture surface comprising calcium carbonate and a binding agent having cementitious properties, allowing the surface to dry, applying a coating composition to said surface which seals the pores thereof against penetration by a light-sensitive emulsion, superimposing on said surface said light-sensitive emulsion, projecting a picture onto the emulsion surface, developing and fixing the latent image, washing the emulsion from the unexposed portions, applying a prime coat of oil paint that adheres firmly to the unexposed portions but only loosely to the exposed portions, removing the prime coat, emulsion and said composition from the exposed portions by means of an acidic agent, which renders the surface porous again on such portions, applying a gum-arabic-nitric acid solution of such strength that it will not affect the paint-covered unexposed portions but will react with the bared calcium carbonate on the exposed portions to form calcium nitrate, and finally coloring with oil paint.

14. A process according to claim 12, in which the strength of the acid is approximately 60 gms. of acid per liter of water.

15. A process, according to claim 12, in which a thin undercoat of varnish is applied to the surface immediately prior to the application of the prime coat of oil paint.

16. A process, according to claim 12, in which the agglutinant is pyroxylin.

17. A process, according to claim 12, in which the agglutinant is dissolved in an organic solvent.

18. A process, according to claim 12, in which the agglutinant is dissolved in a member of the group consisting of methyl acetate and ethyl acetate.

19. A process, according to claim 12, in which the calcium carbonate is derived from sifted and finely ground limestone which latter contains from 70% to 99% of calcium carbonate.

20. A process, according to claim 12, in which the calcium carbonate is derived from sifted and finely ground limestone which latter contains about 97.2% calcium carbonate, 1.9% silicic acid, 0.2% alumina, 0.5% ferric oxide ($Fe_2O_3$), and 0.2% impurities.

21. A process, according to claim 12, in which the porous coating comprises about 60 parts of calcium carbonate mixed with 40 parts of a binding agent, the latter itself comprising about 30% pyroxylin dissolved in 70% of a member of the group consisting of ethyl acetate and methyl acetate.

22. A process, according to claim 12, in which the gum-arabic-nitric acid solution comprises about 2 parts of nitric acid in 98 parts of gum-arabic solution, the latter itself comprising about 1 part of gum-arabic to 19 parts of water.

23. A process, according to claim 12, in which, for the purpose of producing relief pictures, the gum-arabic-nitric acid solution comprises about 10 to 30 parts of nitric acid in 90 to 70 parts of gum-arabic solutions, the latter itself comprising 1 part of gum-arabic to 19 parts of water.

24. A process, according to claim 13, in which the strength of the acid is approximately 60 gms. of acid per liter of water.

25. A process, according to claim 13, in which a thin undercoat of varnish is applied to the surface immediately prior to the application of the prime coat of oil paint.

26. A process, according to claim 13, in which the picture surface is made from calcium carbonate, asbestos fibers, cement, and sufficient water to permit casting.

27. A process, according to claim 13, in which the calcium carbonate is derived from sifted and finely ground limestone which latter contains from 70% to 99% of calcium carbonate.

28. A process, according to claim 13, in which the calcium carbonate is derived from sifted and finely ground limestone which latter contains about 97.2% calcium carbonate, 1.9% silicic acid, 0.2% alumina, 0.5% ferric oxide ($Fe_2O_3$), and 0.2% impurities.

29. A process, according to claim 13, in which the porous coating comprises about 60 parts of calcium carbonate mixed with 40 parts of a binding agent, the latter itself comprising about 30% Collodium cotton dissolved in 70% of a member of the group consisting of ethyl acetate and methyl acetate.

30. A process, according to claim 13, in which the gum-arabic-nitric acid solution comprises about 2 parts of nitric acid in 98 parts of gum-arabic solution, the latter itself comprising about 1 part of gum-arabic to 19 parts of water.

31. A process, according to claim 13, in which, for the purpose of producing relief pictures, the gum-arabic-nitric acid solution comprises about 10 to 30 parts of nitric acid in 90 to 70 parts of gum-arabic solution, the latter itself comprising 1 part of gum-arabic to 19 parts of water.

32. A process, according to claim 19, in which the finely ground limestone is passed through sieves of from 150 to 5000 meshes per square centimeter.

33. A process, according to claim 19, in which the finely ground limestone is passed through a sieve having about 260 meshes per square centimeter.

34. A process, according to claim 27, in which the finely ground limestone is passed through sieves of from 150 to 5000 meshes per square centimeter.

35. A process, according to claim 27, in which the finely ground limestone is passed through a sieve having about 260 meshes per square centimeter.

References Cited in the file of this patent

UNITED STATES PATENTS

| | | |
|---|---|---|
| 1,187,421 | Fox | June 13, 1916 |
| 1,207,527 | Fox | Dec. 5, 1916 |
| 2,204,147 | Murray | June 11, 1940 |
| 2,279,567 | Holman | Apr. 14, 1942 |
| 2,447,836 | Beeber et al. | Aug. 24, 1948 |

FOREIGN PATENTS

| | | |
|---|---|---|
| 9,184 | Great Britain | of 1902 |